(12) United States Patent
Tanaka et al.

(10) Patent No.: US 11,431,044 B2
(45) Date of Patent: Aug. 30, 2022

(54) BATTERY COOLER

(71) Applicant: Mazda Motor Corporation, Hiroshima (JP)

(72) Inventors: Yuichi Tanaka, Higashihiroshima (JP); Sho Sakagami, Hiroshima (JP); Taisuke Hazama, Hiroshima (JP); Katsumasa Yoshida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 392 days.

(21) Appl. No.: 16/681,841

(22) Filed: Nov. 13, 2019

(65) Prior Publication Data

US 2020/0168965 A1 May 28, 2020

(30) Foreign Application Priority Data

Nov. 22, 2018 (JP) .............................. JP2018-219038

(51) Int. Cl.
*H01M 10/65* (2014.01)
*H01M 10/6566* (2014.01)
*H01M 10/613* (2014.01)
*H01M 10/625* (2014.01)
*B60K 1/04* (2019.01)
*B60K 11/08* (2006.01)
*B62D 25/20* (2006.01)
*H01M 50/20* (2021.01)

(52) U.S. Cl.
CPC .......... *H01M 10/6566* (2015.04); *B60K 1/04* (2013.01); *B60K 11/08* (2013.01); *B62D 25/20* (2013.01); *H01M 10/613* (2015.04); *H01M 10/625* (2015.04); *H01M 50/20* (2021.01); *B60K 2001/0438* (2013.01); *H01M 2220/20* (2013.01)

(58) Field of Classification Search
CPC .......... H01M 10/6566; H01M 10/613; H01M 10/625; H01M 50/20; H01M 2220/20; H01M 10/65; B60K 1/04; B60K 11/08; B60K 2001/0438; B62D 25/20
USPC ......................................................... 180/68.5
See application file for complete search history.

(56) References Cited

U.S. PATENT DOCUMENTS

| | | | | |
|---|---|---|---|---|
| 6,085,854 A | * | 7/2000 | Nishikawa ........ | H01M 10/6566 180/68.5 |
| 10,326,184 B2 | * | 6/2019 | Kimura ............... | H01M 10/617 |
| 2009/0139786 A1 | * | 6/2009 | Lee ......................... | B60K 11/06 180/68.1 |
| 2013/0140101 A1 | * | 6/2013 | Lim .................. | H01M 10/6563 180/68.5 |
| 2016/0190662 A1 | * | 6/2016 | Kimura ............. | H01M 10/6551 429/120 |
| 2018/0015839 A1 | * | 1/2018 | Ito .......................... | B60L 50/64 |

FOREIGN PATENT DOCUMENTS

| | | | | |
|---|---|---|---|---|
| JP | 2013-538416 A | | 10/2013 | |
| WO | WO-2015056598 A1 | * | 4/2015 | ............... B60K 1/04 |

* cited by examiner

*Primary Examiner* — James A Shriver, II
*Assistant Examiner* — Hilary L Johns
(74) *Attorney, Agent, or Firm* — Xsensus LLP

(57) ABSTRACT

A passive battery cooler for a battery mounted on a vehicle, includes a battery case that accommodates the battery and attaches to a lower side of a floor panel of the vehicle. The battery cooler also includes a fixing bracket that fixes the battery case to the floor panel of the vehicle, wherein the fixing bracket and a bottom surface of the battery case constitute a ventilation passage that extends in a longitudinal direction of the vehicle.

17 Claims, 10 Drawing Sheets

FRONT ⟵⟶ REAR

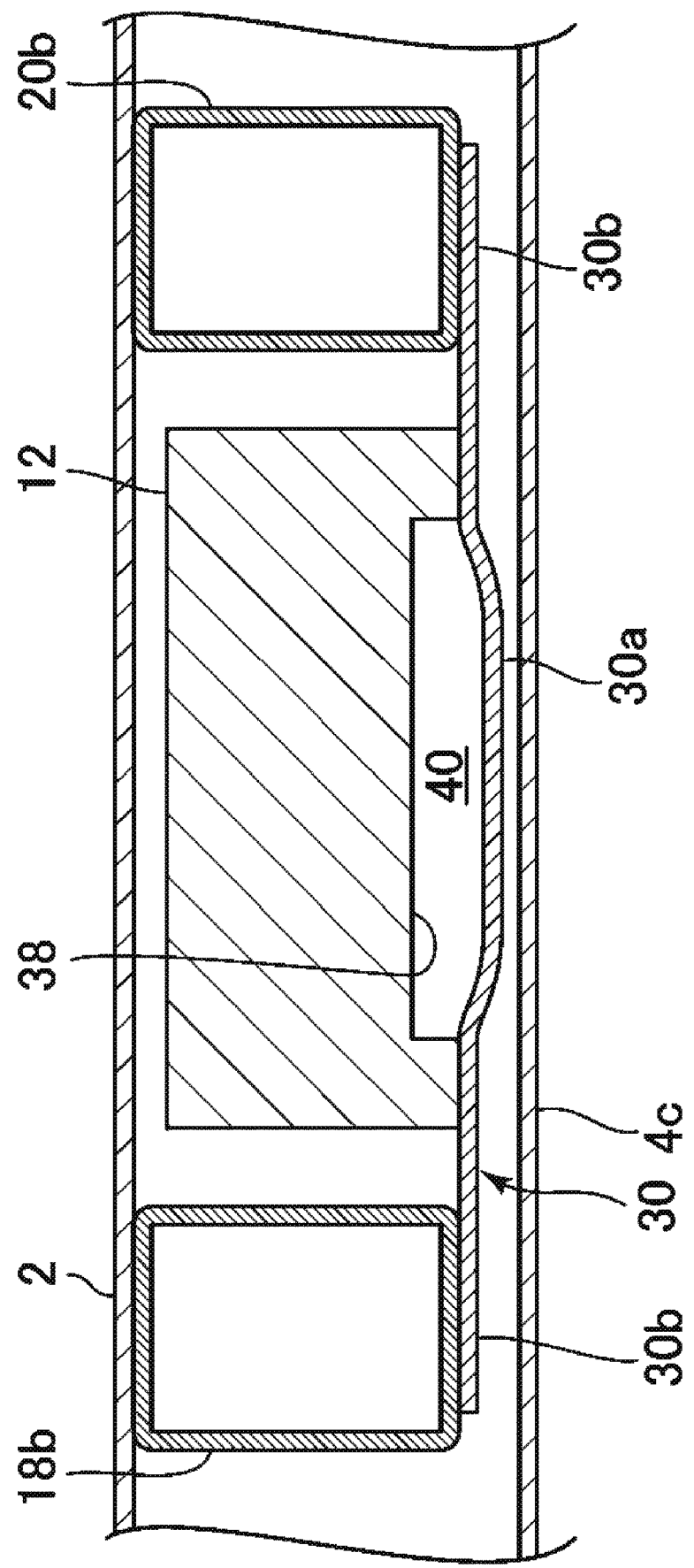

BATTERY COOLER

CROSS-REFERENCE TO RELATED APPLICATION

The present application claims priority to JP 2018-219038, filed Nov. 22, 2018, the entire contents of which are incorporated herein by reference.

TECHNICAL FIELD

The present disclosure relates to a passive battery cooler and, in particular, to a cooler for a battery mounted on a vehicle.

BACKGROUND ART

A battery is usually mounted on a vehicle to actuate a motor for driving the vehicle and electrical components mounted on the vehicle. This battery generates heat during charge and discharge. Thus, the battery has to be cooled such that a temperature thereof falls within an appropriate temperature range. When the battery temperature falls out of the appropriate range, there occur such problems that performance of the battery is deteriorated and that the battery's service life is shortened.

A cooler for a vehicle battery is disclosed in JP-T-2013-538416 (Patent document 1). In this cooler for the vehicle battery, a battery cell group is disposed on a cooling bed, plural flat pipes, each of which is curved in a U-shape, are provided in this cooling bed, and the battery is cooled by a flow of a coolant through each of these flat pipes. In addition, a cooler having a cooling fan to blow cooling air to a battery case mounted on the vehicle, so as to cool the battery is also known.

PRIOR ART DOCUMENTS

Patent Documents

[Patent document 1] JP-T-2013-538416

SUMMARY OF THE DISCLOSURE

Problem to be Solved by the Disclosure

However, in order to cool the battery, the cooling bed through which the coolant flows, a circulation pump (an active device) for circulating the coolant through the flat pipes in this cooling bed, a heat exchanger for cooling the coolant, and the like are required for the cooler for the vehicle battery disclosed in Patent document 1, which leads to problems of a vehicle weight increase and a cost increase. Also, in the case where the cooling fan or the like is used to blow the cooling air, a special device for cooling the battery is required, which leads to the problems of the vehicle weight increase and the cost increase. In addition, there is a case where the battery power is required to drive the circulation pump and the cooling fan. Thus, as recognized by the present inventor, there is a problem that the devices for cooling the battery causes the heat generation of the battery.

In view of the above, the present disclosure has a purpose of providing a passive battery cooler with a simple structure capable of cooling a battery mounted on a vehicle without active parts.

Means for Solving the Problem

In order to solve the above-described problem, the present disclosure describes a cooler for a battery mounted on a vehicle, and includes: a battery case that accommodates the battery and is disposed on a lower side of a floor panel of the vehicle; and a fixing bracket that fixes this battery case to the floor panel. The fixing bracket and a bottom surface of the battery case constitute a ventilation passage.

In an embodiment as configured as described above, the battery case is fixed to the lower side of the floor panel of the vehicle by the fixing bracket. In addition, the ventilation passage is formed between the fixing bracket and the bottom surface of the battery case. When travel wind of the vehicle flows through this ventilation passage, the battery case is cooled.

According to the present embodiment, the ventilation passage is formed by the fixing bracket that fixes the battery case to the lower side of the floor panel, and the battery case is cooled by the travel wind flowing through this ventilation passage. Thus, it is possible to cool the battery without using special equipment for cooling the battery. Therefore, it is possible to prevent a significant weight increase and a significant cost increase of the vehicle by a device for cooling the battery.

In the present embodiment, the fixing bracket is preferably configured that a closed cross section thereof is formed by the fixing bracket and the bottom surface of the battery case, and the ventilation passage is preferably opened in a longitudinal direction of the vehicle.

According to the present embodiment configured as described above, the closed cross section is formed by the fixing bracket and the bottom surface of the battery case. Thus, it is possible to prevent the travel wind, which flows through the ventilation passage, from partially flowing to the outside from the middle of the ventilation passage. Therefore, the battery can effectively be cooled.

In the present embodiment, the fixing bracket is preferably configured that a flow passage cross-sectional area at a front end of the ventilation passage is larger than a flow passage cross-sectional area of a portion behind the front end.

According to the present embodiment configured as described above, the large flow passage cross-sectional area is provided at the front end of the ventilation passage. Thus, a further large amount of air can be introduced into the ventilation passage. In addition, the flow passage cross-sectional area at the front end is larger than the flow passage cross-sectional area in the portion behind the front end. Thus, the air, which is introduced into the ventilation passage, is accelerated in the ventilation passage. Therefore, a cooling effect can further be increased.

In the present embodiment, a battery recessed section is preferably formed on the bottom surface of the battery case, and the ventilation passage is preferably formed between a surface of the battery recessed section and the fixing bracket. According to the present embodiment configured as described above, the ventilation passage is formed by the battery recessed section on the bottom surface of the battery case. Thus, it is possible to enlarge the flow passage cross-sectional area of the ventilation passage. Therefore, the cooling effect can further be increased by causing the flow of the further large amount of the air.

In the present embodiment, the fixing bracket preferably has: a fixed section that abuts the bottom surface of the battery case; and a ventilation passage forming section that is located farther away from the bottom surface of the battery case than the fixed section.

According to the present embodiment configured as described above, the fixing bracket has the fixed section and the ventilation passage forming section. Thus, it is possible to constitute the ventilation passage while fixing the battery case by the fixing bracket with a simple structure.

Preferably, in the present embodiment, a first seal member that is attached to the battery case is further provided. The first seal member is preferably attached to a front side of the front end of the ventilation passage, a prime mover is preferably disposed on a front side of the first seal member, and high-temperature air that is heated by the prime mover is preferably thereby suppressed from flowing into the ventilation passage.

In general, in a bottom portion of the vehicle, there is a portion through which the high-temperature air heated by an engine or the like flows. When such high-temperature air flows into the ventilation passage, battery cooling efficiency is degraded. However, the present embodiment configured as described above has the first seal member that suppresses an inflow of the high-temperature air into the ventilation passage and is attached to the front side of the front end of the ventilation passage for suppressing. Thus, it is possible to suppress the flow of the high-temperature air into the ventilation passage. Therefore, it is possible to prevent significant degradation of the cooling efficiency.

In the present embodiment, a cross member that is provided to cross the battery case in a vehicle width direction of the vehicle is preferably attached to the floor panel, and the fixing bracket is preferably configured to include: a first fixing bracket that is attached on a front side of the cross member; and a second fixing bracket that is attached on a rear side of the cross member.

In general, various members are attached to the floor panel of the vehicle for a purpose of securing required strength, and the like. According to the present embodiment configured as described above, the fixing bracket is configured to include: the first fixing bracket that is attached on the front side of the cross member; and the second fixing bracket that is attached on a rear side of the cross member. Thus, even in the case where the cross member is provided in the manner to cross the battery case, it is possible to form the ventilation passage in a sufficient length. Therefore, the entire battery case can be cooled.

In the present embodiment, a second seal member is preferably attached to the bottom surface of the battery case such that an additional ventilation passage is formed between the cross member and the bottom surface of the battery case.

According to the present embodiment configured as described above, the second seal member is attached to the bottom surface of the battery case, and the additional ventilation passage is formed between the cross member and the bottom surface of the battery case. Thus, the portion as the cross member can also be used as the ventilation passage. Therefore, the cooling effect can further be increased.

Preferably, in the present embodiment, a protector that is attached to the battery case in a manner to protect the battery case is further provided. The protector is preferably attached a portion between the first fixing bracket and the second fixing bracket in a manner to extend in the longitudinal direction of the vehicle.

According to the present embodiment configured as described above, the protector is attached to the portion between the first fixing bracket and the second fixing bracket. Thus, even in the case where a side of the vehicle or the like is collided and the floor panel is deformed, it is possible to suppress damage to the battery case by the protector.

Preferably, in the present embodiment, an undercover that is attached to the bottom surface of the vehicle is further provided. The undercover preferably covers the battery case and the fixing bracket, and has an opening, from which travel wind is introduced into a front-end opening of the ventilation passage.

According to the present embodiment configured as described above, the undercover is attached to the bottom surface of the vehicle. Thus, an aerodynamic character of the vehicle can be improved. In addition, the undercover is provided with the opening, from which the travel wind is introduced into the front-end opening of the ventilation passage. Thus, even in the case where the bottom surface of the vehicle is covered with the undercover, it is possible to introduce a sufficient amount of the travel wind into the ventilation passage.

Advantage of the Embodiment

According to the passive battery cooler of the present disclosure, the battery, which is mounted on the vehicle, can be cooled with a simple structure, without active components.

BRIEF DESCRIPTION OF THE DRAWINGS

FIG. 10 is a cross-sectional view taken along line X-X in FIG. 9.

MODES FOR CARRYING OUT THE DISCLOSURE

Next, a description will be made on a preferred embodiment of the present disclosure with reference to the accompanying drawings.

Figure 1:
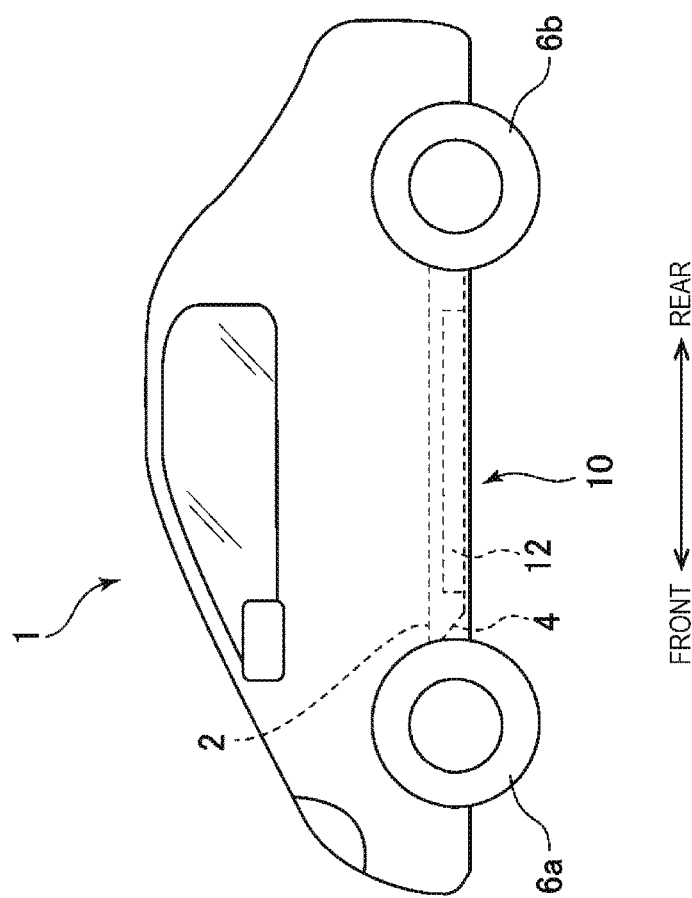
FIG. 1 is a side view of a vehicle on which a battery cooler according to an embodiment of the present disclosure is mounted.
Figure 2:
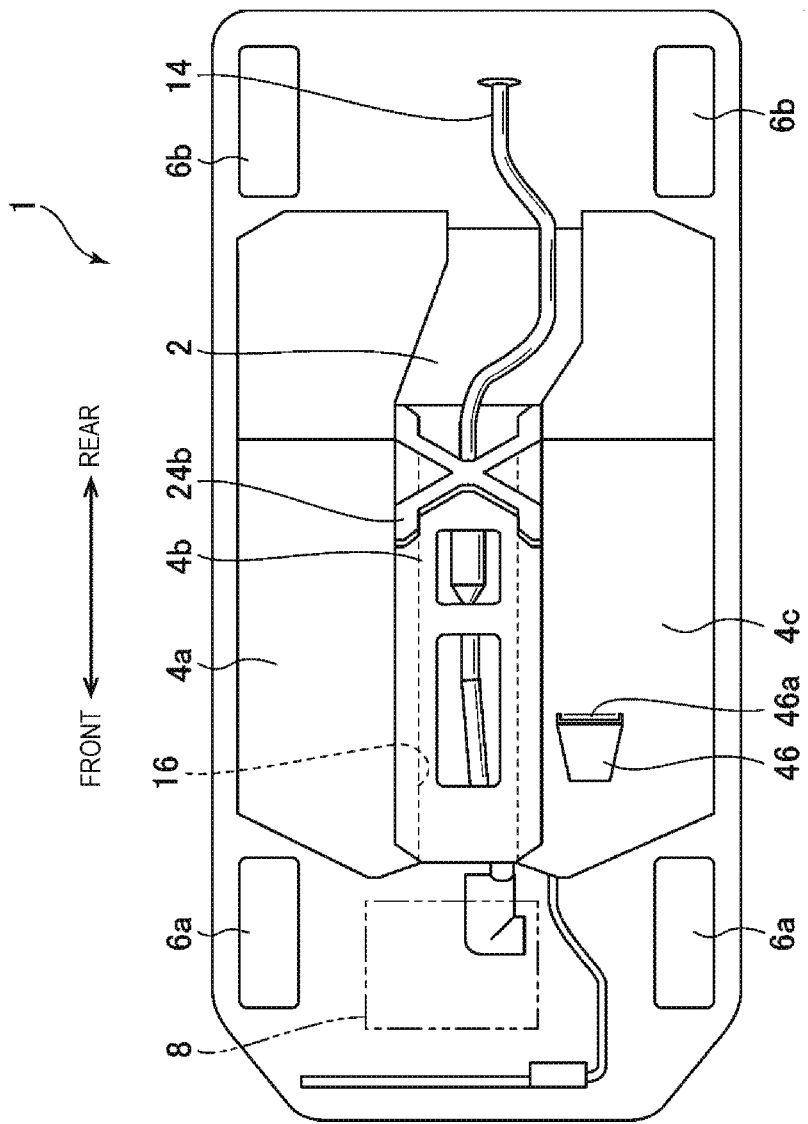
FIG. 2 is a bottom view of the vehicle on which the battery cooler according to the embodiment of the present disclosure is mounted.
Figure 3:
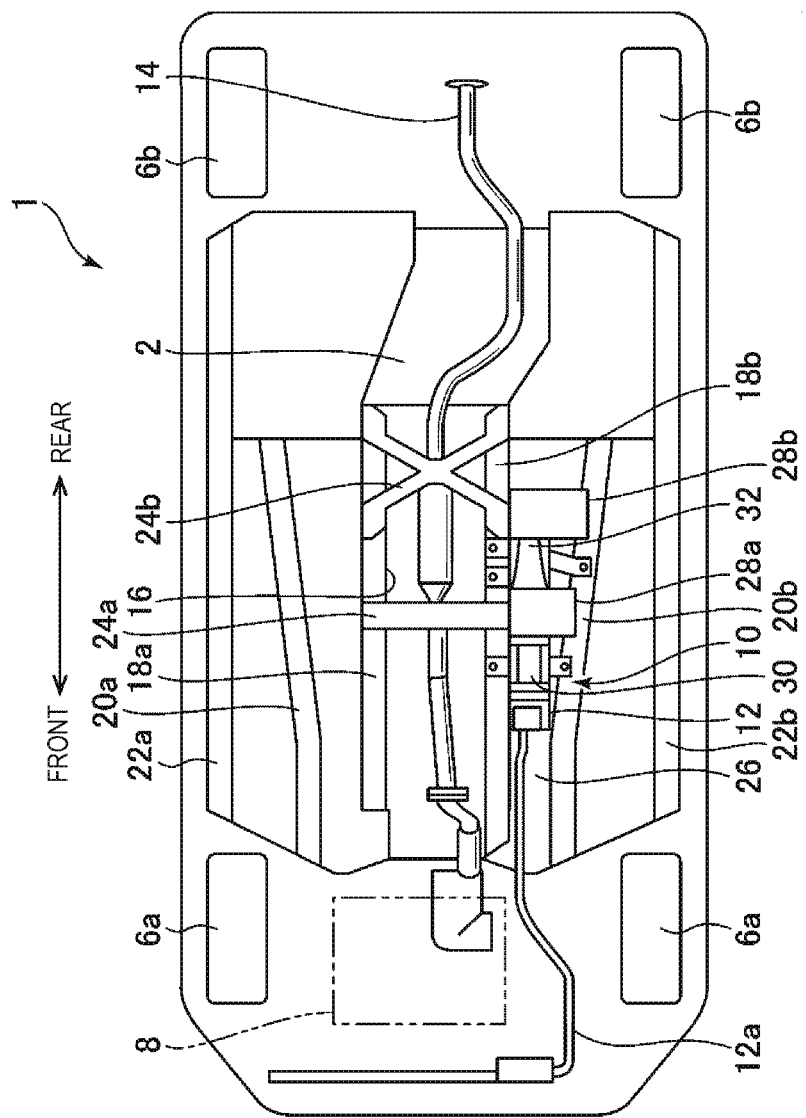
FIG. 3 is a bottom view of the vehicle on which the battery cooler according to the embodiment of the present disclosure is mounted, and is a view of a state where an undercover is detached.
Figure 4:
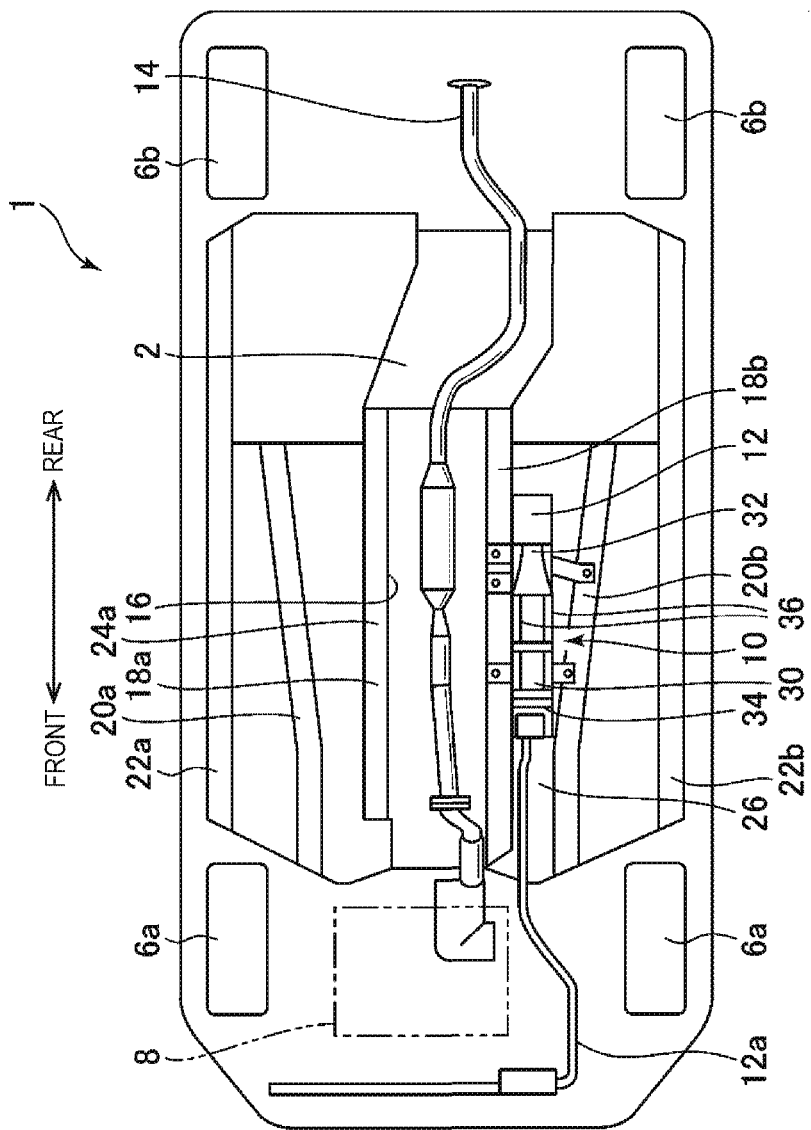
FIG. 4 is a view of a state where a cross member is further detached in FIG. 3.

FIG. 1 is a side view of a vehicle on which a battery cooler according to the embodiment of the present disclosure is mounted. FIG. 2 is a bottom view of the vehicle on which the battery cooler according to the embodiment of the present disclosure is mounted. FIG. 3 is a bottom view of the vehicle on which the battery cooler according to the embodiment of the present disclosure is mounted, and is a view of a state where an undercover is detached. FIG. 4 is a view of a state where a cross member is further detached in FIG. 3.

As illustrated in FIG. 1, a battery cooler 10 according to the embodiment of the present disclosure is provided in a bottom portion of a vehicle 1, and is configured to cool a battery that is disposed in the bottom portion of the vehicle 1. More specifically, the battery (an assembly of battery cells) mounted on the vehicle 1 is accommodated in a battery case 12. This battery case 12 is disposed on a lower side of a floor panel 2 of the vehicle 1 in a manner to extend in a longitudinal direction of the vehicle 1 at a position between a front wheel 6a and a rear wheel 6b when seen in a side view of the vehicle 1. Furthermore, the battery case 12 is covered with an undercover 4 from below. Thus, in the bottom portion of the vehicle 1, the battery case 12 is located between the floor panel 2 and the undercover 4.

As illustrated in FIG. 2, the undercover 4, which is attached to a bottom surface of the vehicle 1, is configured to include a first cover 4a, a second cover 4b, and a third cover 4c aligned in a vehicle width direction. The floor panel 2 of the vehicle 1 is partially covered with these first cover 4a, second cover 4b, and third cover 4c. The battery cooler 10 in this embodiment is covered with the third cover 4c of the undercover 4. In addition, in this embodiment, an engine 8 is disposed in a front portion of the vehicle 1, and, at a center of the bottom portion of the vehicle 1, an exhaust pipe 14 extending from this engine 8 extends to the rear of the vehicle 1. The exhaust pipe 14 is accommodated in a tunnel section 16 that is formed at a center in the vehicle width direction of the floor panel 2 to extend in the longitudinal direction of the vehicle 1, and the exhaust pipe 14 is partially covered with the second cover 4b disposed at the center in the vehicle width direction.

As illustrated in FIG. 3, in a state where the undercover 4 of the vehicle 1 is detached, tunnel side frames 18a, 18b, each of which is provided to extend in the longitudinal direction of the vehicle 1, are exposed on both sides of the tunnel section 16. In addition, on both outer sides of the tunnel side frames 18a, 18b, floor frames 20a, 20b that are disposed substantially in a chevron shape are provided in a manner to extend in the longitudinal direction of the vehicle 1. Furthermore, side sills 22a, 22b are provided along both sides of the vehicle 1. These tunnel side frames 18a, 18b, floor frames 20a, 20b, and side sills 22a, 22b are fixed to the lower side of the floor panel 2, reinforces the floor panel 2, and increases rigidity of the entire vehicle 1.

At positions between the two tunnel side frames 18a, 18b, a first tunnel cross member 24a and a second tunnel cross member 24b, each of which extends in the vehicle width direction, are attached in a manner to cross the tunnel section 16. The first tunnel cross member 24a is a slender plate member, the second tunnel cross member 24b is an X-shaped plate member, and first tunnel cross member 24a and the second tunnel cross member 24b supports the exhaust pipe 14, which is accommodated in the tunnel section 16, and the like from the lower side. Since the first tunnel cross member 24a and the second tunnel cross member 24b are attached in the manner to cross the tunnel section 16, deformation of the tunnel section 16 during a side collision of the vehicle 1 is suppressed.

In an elongated recessed section 26 that is located between the tunnel side frame 18b and the floor frame 20b and extends in the longitudinal direction of the vehicle 1, the elongated rectangular-parallelepiped battery case 12 is accommodated. A first recessed section cross member 28a and a second recessed section cross member 28b as cross members are attached to the tunnel side frame 18b and the floor frame 20b in a manner to cross this elongated recessed section 26. Each of these first recessed section cross member 28a and second recessed section cross member 28b is a rectangular plate member and suppresses deformation of the recessed section 26 during the side collision of the vehicle 1.

Furthermore, a fixing bracket that fixes the battery case 12 to the floor panel 2 is attached to the tunnel side frame 18b and the floor frame 20b in a manner to cross the recessed section 26. This fixing bracket is constructed of a first fixing bracket 30 and a second fixing bracket 32 and abut a bottom surface of the battery case 12 to fix the battery case 12 to the floor panel 2.

The first fixing bracket 30 is disposed on a front side of the first recessed section cross member 28a in the longitudinal direction of the vehicle 1, and the second fixing bracket 32 is disposed between the first recessed section cross member 28a and the second recessed section cross member 28b in the longitudinal direction of the vehicle 1. Accordingly, these members are disposed in an order of the first fixing bracket 30, the first recessed section cross member 28a, the second fixing bracket 32, and the second recessed section cross member 28b from a front side of the vehicle 1. These first fixing bracket 30 and second fixing bracket 32 will be described in detail later.

As illustrated in FIG. 4, a harness 12a is attached to a front end of the battery case 12 in the longitudinal direction of the vehicle 1, and power stored in the battery is supplied to various types of on-board electrical equipment via this harness 12a. In addition, a first seal member 34 is attached to the front end of the battery case 12 in a manner to surround the battery case 12. Furthermore, a second seal member 36 is attached to a portion of the battery case 12 that opposes the first recessed section cross member 28a. Detailed configurations and operation of these first seal member 34 and second seal member 36 will be described later.

Next, a description will be made on a battery cooling structure with reference to FIG. 5 to FIG. 10.

Figure 5:
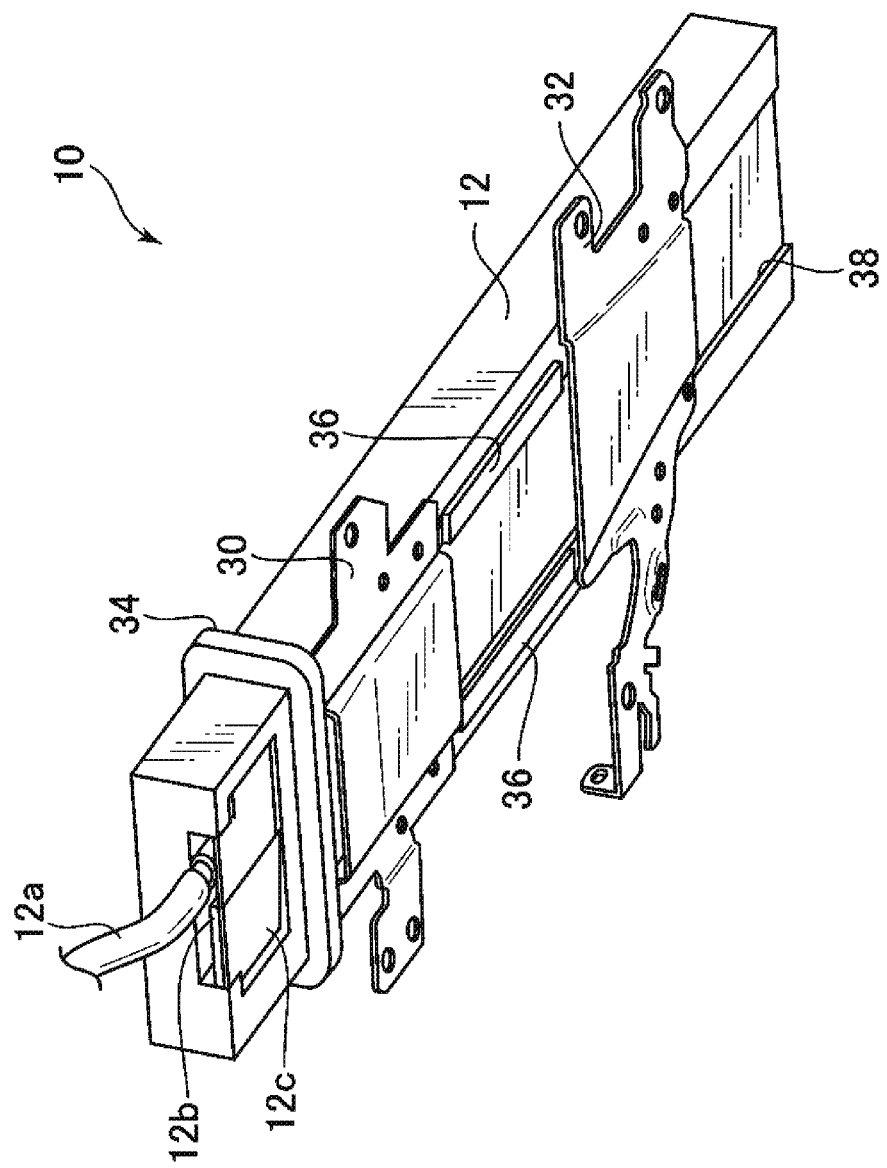
FIG. 5 is a perspective view of a state where the battery cooler according to the embodiment of the present disclosure is detached from a vehicle body.
Figure 6:
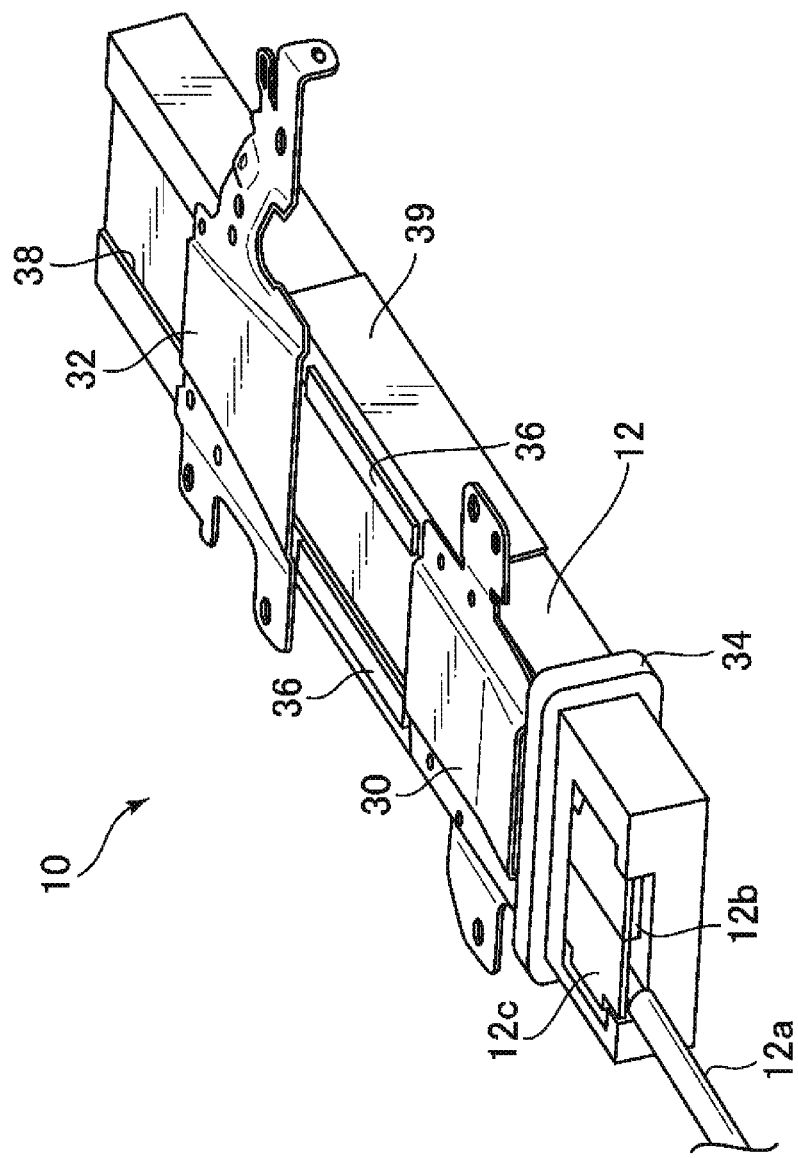
FIG. 6 is a perspective view of the state where the battery cooler according to the embodiment of the present disclosure is detached from the vehicle body.
Figure 7:
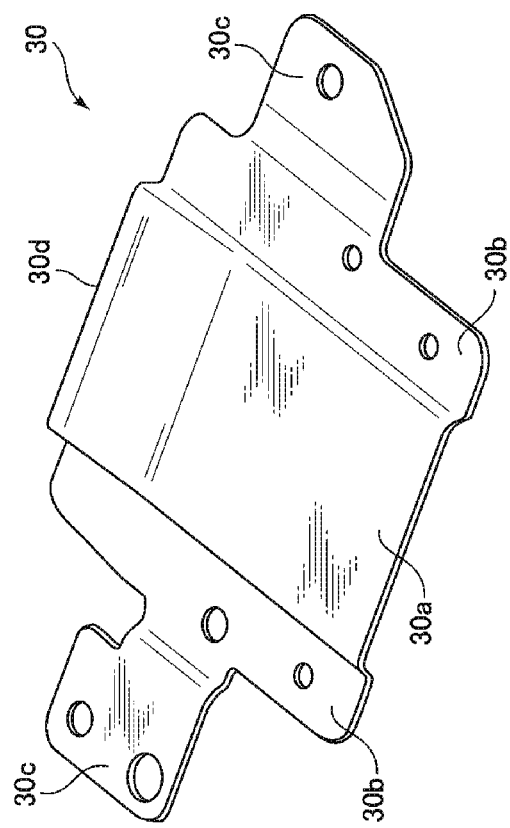
FIG. 7 is a perspective view of a first fixing bracket provided in the battery cooler according to the embodiment of the present disclosure.
Figure 8:
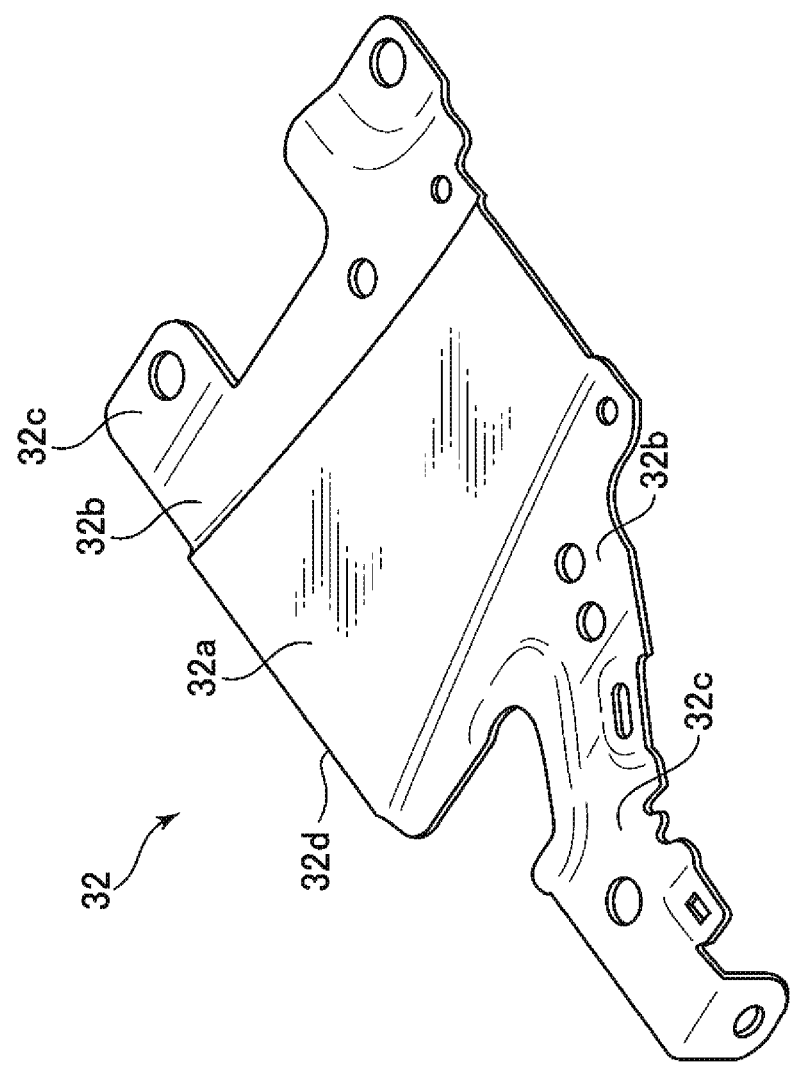
FIG. 8 is a perspective view of a second fixing bracket provided in the battery cooler according to the embodiment of the present disclosure.
Figure 9:
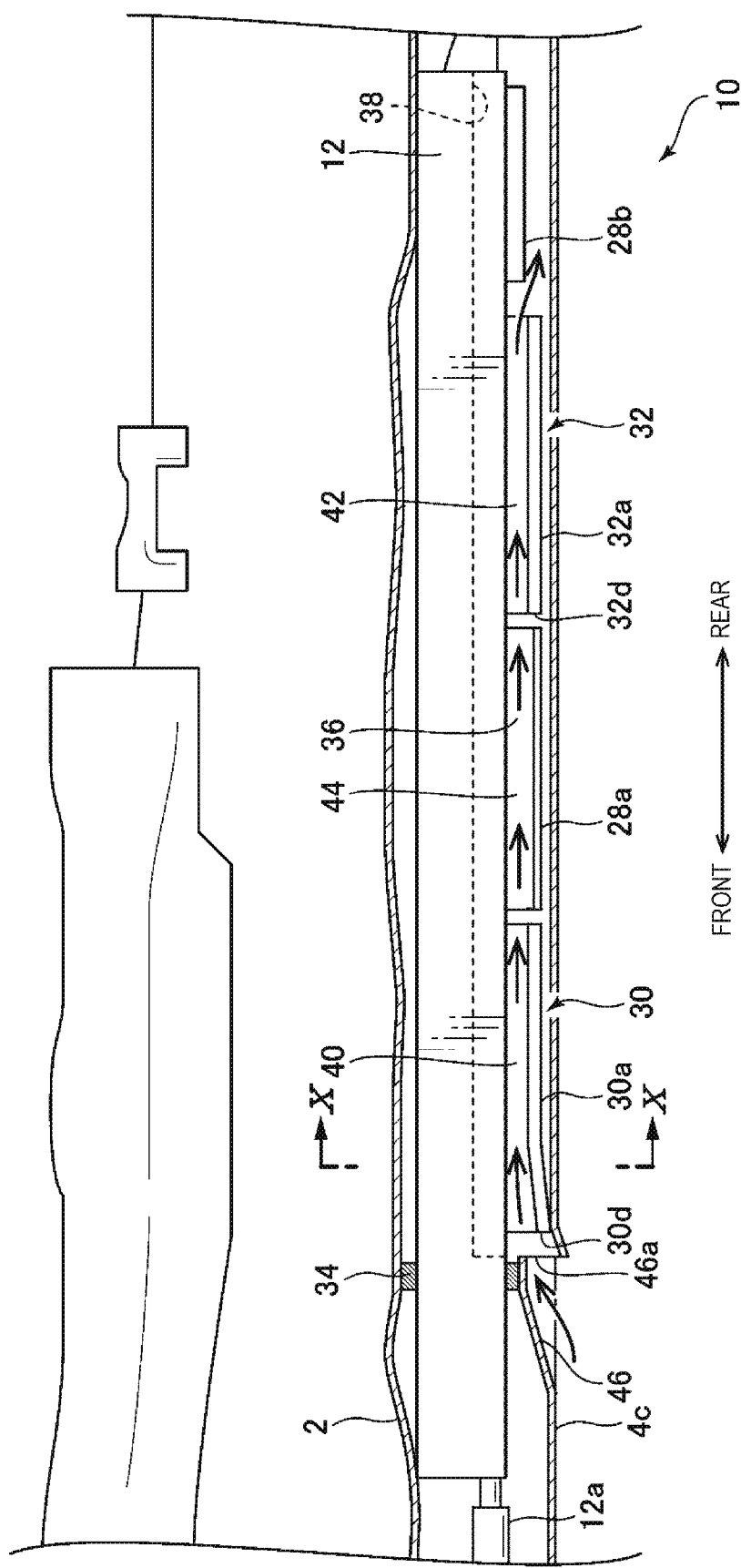
FIG. 9 is an enlarged cross-sectional view of a state where the battery cooler according to the embodiment of the present disclosure is attached to the vehicle body of the vehicle.

FIG. 5 and FIG. 6 are perspective views of a state where the battery cooler according to the embodiment of the present disclosure is detached from a vehicle body. FIG. 7 is a perspective view of the first fixing bracket provided in the battery cooler according to the embodiment of the present disclosure. FIG. 8 is a perspective view of the second fixing bracket provided in the battery cooler according to the embodiment of the present disclosure. FIG. 9 is an enlarged cross-sectional view of a state where the battery cooler according to the embodiment of the present disclosure is attached to the vehicle body of the vehicle 1. FIG. 10 is a cross-sectional view taken along line X-X in FIG. 9.

As illustrated in FIG. 5 and FIG. 6, the battery cooler 10 according to the embodiment of the present disclosure is configured to include: the battery case 12 that is made of metal; and the first fixing bracket 30 and the second fixing bracket 32 as the fixing brackets that support the battery case 12 from below and fix the battery case 12 to the floor panel 2. These first and second fixing brackets 30, 32 abut the bottom surface of the battery case 12, thereby press the battery case 12 against the floor panel 2, and fix the battery case 12 to the floor panel 2.

A terminal 12b for connecting the harness 12a is provided at the front end of the battery case 12 in the longitudinal direction of the vehicle 1, and this terminal 12b and an electrode of the harness 12a, which is connected thereto, are covered with a terminal cover 12c. On a rear side of this terminal cover 12c, the first seal member 34, which is made of an elastic member, is disposed around the battery case 12. In a state where the undercover 4 (the third cover 4c) is attached, this first seal member 34 abuts the third cover 4c and seals a space between the bottom surface of the battery case 12 and the third cover 4c.

In addition, on the bottom surface of the battery case 12, a battery recessed section 38 is provided to extend in a longitudinal direction of the elongated battery case 12. This battery recessed section 38 is a shallow and wide groove with a constant width, and is substantially provided in the entire battery case 12 in the longitudinal direction from a rear side of the first seal member 34 to a rear end of the battery case 12.

Furthermore, at a position between the first fixing bracket 30 and the second fixing bracket 32, the second seal member 36, which is made of an elongated plate-shaped elastic member, is attached to each side of this battery recessed section 38. In a state where the first recessed section cross member 28a is attached, this second seal member 36 abuts the first recessed section cross member 28a and seals a space between the bottom surface of the battery case 12 and the first recessed section cross member 28a.

Moreover, as illustrated in FIG. 6, a thin plate-shaped protector 39 is attached to a side surface of the battery case 12. This protector 39 is attached between the first fixing bracket 30 and the second fixing bracket 32 in a manner to extend in the longitudinal direction of the vehicle 1, and protects the battery case 12 and the battery (not illustrated) therein during the side collision of the vehicle 1 and the like.

As illustrated in FIG. 7, the first fixing bracket 30 is a member that is formed by bending a metal sheet by pressing or the like, and has: a central ventilation passage forming section 30a; and a fixed section 30b that is formed on each side of this ventilation passage forming section 30a. Furthermore, an arm section 30c is formed to be bulged from a side of each of the fixed sections 30b. When the first fixing bracket 30 is attached to the vehicle 1, these arm sections 30c are fixed to the tunnel side frame 18b and the floor frame 20b by bolts (not illustrated).

In FIG. 7, the ventilation passage forming section 30a is a rectangular region that is bent to be raised from the fixed sections 30b on both of the sides, and the ventilation passage forming section 30a is located farther away from the bottom surface of the battery case 12 than the fixed section 30b. (Note that, in a state of being attached to the vehicle 1, the ventilation passage forming section 30a is located lower than the fixed section 30b.) In addition, the ventilation passage forming section 30a has the substantially same width as the battery recessed section 38 on the bottom surface of the battery case 12 and, in the state where the battery case 12 is fixed by the first fixing bracket 30, is disposed in a manner to oppose the battery recessed section 38. In this way, a ventilation passage is formed between the ventilation passage forming section 30a and the bottom surface of the battery case 12. Meanwhile, in the state where the battery case 12 is fixed by the first fixing bracket 30, the fixed sections 30b on both of the sides of the ventilation passage forming section 30a abut portions on both outer sides of the battery recessed section 38 and press the battery case 12 at a specified position. Furthermore, a front end 30d (an end on a back side in FIG. 7) of the ventilation passage forming section 30a is formed to be higher than a rear end (an end on a near side in FIG. 7). This front end 30d, which is formed to be high in the ventilation passage forming section 30a, is disposed in the front side of the vehicle 1. In this way, a front-end opening of the ventilation passage, which is formed between the ventilation passage forming section 30a and the bottom surface of the battery case 12, has a large opening area.

Next, as illustrated in FIG. 8, similar to the first fixing bracket 30, the second fixing bracket 32 is a member that is also formed by bending a metal sheet by pressing or the like, and has: a central ventilation passage forming section 32a; and a fixed section 32b that is formed on each side of this ventilation passage forming section 32a. Furthermore, an arm section 32c is formed to be bulged from a side of each of the fixed sections 32b. When the second fixing bracket 32 is attached to the vehicle 1, these arm sections 32c are fixed to the tunnel side frame 18b and the floor frame 20b by bolts (not illustrated).

In FIG. 8, the ventilation passage forming section 32a is a trapezoidal region that is bent to be raised with a constant height from the fixed sections 32b on both of the sides, and the ventilation passage forming section 32a is located farther away from the bottom surface of the battery case 12 than the fixed section 32b. (Note that, in a state of being attached to the vehicle 1, the ventilation passage forming section 32a is located lower than the fixed section 32b.) In the state where the battery case 12 is fixed by the second fixing bracket 32, the ventilation passage forming section 32a is disposed in the manner to oppose the battery recessed section 38. In this way, a ventilation passage is formed between the ventilation passage forming section 32a and the bottom surface of the battery case 12. In addition, in the ventilation passage forming section 32a, a wide bottom side section 32d has the substantially same width as the battery recessed section 38 on the bottom surface of the battery case 12, and a narrow upper side section has a narrower width than the battery recessed section 38. Meanwhile, in the state where the battery case 12 is fixed by the second fixing bracket 32, the fixed sections 32b on both of the sides of the ventilation passage forming section 32a abut the portions on both of the outer sides of the battery recessed section 38 and press the battery case 12 at the specified position.

Furthermore, the wide bottom side section 32d of the ventilation passage forming section 32a is disposed in the front side of the vehicle 1. In this way, the ventilation passage, which is formed between the ventilation passage forming section 32a and the bottom surface of the battery case 12, is formed such that a flow passage cross-sectional area is reduced rearward.

Next, a description will be made on the ventilation passages that are formed by the first fixing bracket 30, the second fixing bracket 32, and the like with reference to FIG. 9 and FIG. 10.

As illustrated in FIG. 9, in the state where the battery case 12 is fixed to the floor panel 2 by the first fixing bracket 30, a clearance is provided between the ventilation passage forming section 30a of the first fixing bracket 30 and a surface of the battery recessed section 38 of the battery case 12, and this clearance functions as a ventilation passage 40 (FIG. 10). As illustrated in FIG. 10, the ventilation passage 40, which is formed by the first fixing bracket 30 and the bottom surface of the battery case 12, forms a closed cross section. This ventilation passage 40 extends in the longitudinal direction of the vehicle 1 (the longitudinal direction of the battery case 12), and is formed to be opened in the longitudinal direction. Similarly, a clearance is also formed between the ventilation passage forming section 32a of the second fixing bracket 32 and the battery recessed section 38, and this clearance functions as a ventilation passage 42. Furthermore, the first recessed section cross member 28a is attached to a portion between the first fixing bracket 30 and the second fixing bracket 32, and the two second seal members 36 are held in parallel between this first recessed section cross member 28a and the bottom surface of the battery case 12. A space that is surrounded by these first recessed section cross member 28a, (the battery recessed section 38 of) battery case 12, and two second seal members 36 also function as an additional ventilation passage 44.

The ventilation passages 40, 42 and the additional ventilation passage 44 are formed as described above. In this way, when the vehicle 1 travels, travel wind flows through the ventilation passages 40, 42 and the additional ventilation passage 44. As a result, the battery case 12, which forms a part of each of the ventilation passages, is cooled by the travel wind. Thus, the first fixing bracket 30, the second fixing bracket 32, and the battery case 12 function as the battery cooler 10. Similarly, the first recessed section cross member 28a, the second seal member 36, and the battery case 12 also function as the battery cooler 10.

Here, as described above, the battery case 12, the first fixing bracket 30, the second fixing bracket 32, and the first recessed section cross member 28a are covered with the undercover 4 (the third cover 4c). However, as illustrated in FIG. 2 and FIG. 9, the third cover 4c is provided with a dent section 46, and an opening 46a, from which the travel wind is introduced, is formed inside this dent section 46. This opening 46a is opened to the front of the vehicle 1, and is provided at a position that matches the front-end opening of the ventilation passage 40 formed by the front end 30d of the first fixing bracket 30. Thus, air on a lower side of the vehicle body is effectively introduced from the opening 46a. Then, the inflow travel wind smoothly flows into the ventilation passage 40 through the front-end opening, further flows through the additional ventilation passage 44 and the ventilation passage 42, and thereby cools the entire bottom surface of the battery case 12.

In addition, since the front end 30d of the first fixing bracket 30 is formed to significantly separate from the bottom surface of the battery case 12, the large front-end opening of the ventilation passage 40 is obtained. Thus, a large amount of the air can be introduced into the ventilation passage 40. That is, the first fixing bracket 30 is configured that the flow passage cross-sectional area at the front end of the ventilation passage 40 is larger than the flow passage cross-sectional area of the portion behind the front end. As a result, the travel wind, which flows in from the front-end opening of the ventilation passage 40, flows to the rear of the vehicle 1 while being accelerated in the ventilation passage 40.

The travel wind, which has flowed through the ventilation passage 40, further flows into the additional ventilation passage 44 formed between the battery case 12 and the first recessed section cross member 28a. This first recessed section cross member 28a is a structural member of the vehicle 1 and thus is not a member for attaching the battery case 12. However, the first recessed section cross member 28a functions as a member that forms the additional ventilation passage 44 by sealing a clearance between the first recessed section cross member 28a and the battery case 12 using the second seal member 36.

The travel wind, which has flowed through the additional ventilation passage 44, further flows into the ventilation passage 42 formed between the battery case 12 and the second fixing bracket 32. Since the ventilation passage forming section 32a of the second fixing bracket 32 is formed such that the width thereof is reduced rearward (FIG. 8), the flow passage cross-sectional area at the front end of the ventilation passage 42 is larger than the flow passage cross-sectional area of the portion behind the front end. As a result, the travel wind, which flows in from the front-end opening of the ventilation passage 42, flows to the rear of the vehicle 1 while being accelerated in the ventilation passage 42.

In addition, as illustrated in FIG. 9, the first seal member 34, which is attached to the front end of the battery case 12, is located on a back side of the dent section 46 provided in the third cover 4c. That is, the first seal member 34 is provided on the front side in the vehicle 1 from the front-end opening of the ventilation passage 40, and seals a clearance between the third cover 4c and the battery case 12. Accordingly, even in the case where rainwater or the like enters from the opening 46a provided in the dent section 46, it is possible to suppress the rainwater or the like from flowing to a portion in front of the opening 46a and contacting the terminal 12b of the battery case 12, and the like. Furthermore, as described above, in this embodiment, the engine 8 is disposed in the front portion of the vehicle 1, and the air that is heated by heat of the engine 8 in an engine room (not illustrated) or the like flows to the rear of the vehicle 1. However, since the clearance between the third cover 4c and the battery case 12 is sealed by the first seal member 34, it is possible to suppress the air, which is heated in the engine room (not illustrated) or the like, from flowing into the ventilation passage 40 from the front-end opening. Thus, cooling efficiency can be improved.

According to the battery cooler 10 in this embodiment of the present disclosure, the ventilation passages 40, 42 are formed by the fixing brackets (the first fixing bracket 30 and the second fixing bracket 32) for fixing the battery case 12 to the lower side of the floor panel 2, and the battery case 12 is cooled by the travel wind flowing through these ventilation passages (FIG. 9). Thus, it is possible to cool the battery without using special equipment for cooling the battery in the battery case 12. Therefore, it is possible to prevent a significant weight increase and a significant cost increase of the vehicle 1 by a device for cooling the battery.

According to the battery cooler 10 in this embodiment, the closed cross section is formed by the bottom surface of the battery case 12 and each of the first fixing bracket 30 and the second fixing bracket 32 (FIG. 10). Thus, it is possible to prevent the travel wind, which flows through the ventilation passages 40, 42, from partially flowing to the outside from the middle of the ventilation passage. Therefore, the battery can effectively be cooled.

According to the battery cooler 10 in this embodiment, the large flow passage cross-sectional area is provided at the front end of each of the ventilation passages 40, 42 (FIG. 7 and FIG. 8). Thus, the further large amount of the air can be introduced into the ventilation passages. In addition, the flow passage cross-sectional area at the front end is larger than the flow passage cross-sectional area in the portion behind the front end. Thus, the air, which is introduced into each of the ventilation passages, is accelerated in the ventilation passage. Therefore, a cooling effect can further be increased.

According to the battery cooler 10 in this embodiment, the ventilation passages 40, 42 are formed by the battery recessed section 38 on the bottom surface of the battery case 12. Thus, it is possible to enlarge the flow passage cross-sectional area of each of the ventilation passages. Therefore, the cooling effect can further be increased by causing the flow of the further large amount of the air.

According to the battery cooler 10 in this embodiment, the first fixing bracket 30 has the fixed section 30b and the ventilation passage forming section 30a (FIG. 7), and the second fixing bracket 32 has the fixed section 32b and the ventilation passage forming section 32a (FIG. 8). Thus, it is possible to constitute the ventilation passages 40, 42 while fixing the battery case 12 by the first and second fixing brackets with the simple structures.

The battery cooler 10 in this embodiment has the first seal member 34 that suppresses an inflow of high-temperature air into the ventilation passage 40 and is attached to the front side of the front end of the ventilation passage 40. Thus, it is possible to suppress the flow of the high-temperature air into the ventilation passage 40. Therefore, it is possible to prevent significant degradation of a cooling efficiency.

According to the battery cooler 10 in this embodiment, the fixing brackets are configured to include: the first fixing bracket 30 in front of the first recessed section cross member 28a; and the second fixing bracket 32 behind the first recessed section cross member 28a. Thus, even in the case where the first recessed section cross member 28a is provided in the manner to cross the battery case 12, it is possible to form the ventilation passage in the sufficient length. Therefore, the entire battery case 12 can be cooled.

According to the battery cooler 10 in this embodiment, the second seal member 36 is attached to the bottom surface of the battery case 12, and the additional ventilation passage 44 is formed between the first recessed section cross member 28a and the bottom surface of the battery case 12. Thus, the portion as the first recessed section cross member 28a can also be used as the ventilation passage. Therefore, the cooling effect can further be increased.

According to the battery cooler 10 in this embodiment, the protector 39 is attached to the portion between the first fixing bracket 30 and the second fixing bracket 32. Thus, even in the case where the side of the vehicle 1 or the like is collided and the floor panel 2 is deformed, it is possible to suppress damage to the battery case 12 by the protector 39.

According to the battery cooler 10 in this embodiment, the undercover 4 is attached to the bottom surface of the vehicle 1. Thus, an aerodynamic character of the vehicle 1 can be improved. In addition, the undercover 4 (the third cover 4c) is provided with the opening 46a (FIG. 2), from which the travel wind is introduced into the front-end opening of the ventilation passage 40. Thus, even in the case where the bottom surface of the vehicle 1 is covered with the undercover 4, it is possible to introduce a sufficient amount of the travel wind into the ventilation passage 40.

The description has been made so far on embodiments of the present disclosure, and various changes can be made to the above-described embodiment. In particular, in the above-described embodiment, the fixing brackets are configured to include the first and second fixing brackets. However, the single fixing bracket or the three or more fixing brackets may be provided. In addition, in the above-described embodiment, the ventilation passages are formed by providing the battery recessed section 38 on the bottom surface of the battery case 12 and providing the ventilation passage forming sections 30a, 32a in the first and second fixing brackets. However, the ventilation passage can also be formed only by any one of the battery recessed section and the ventilation passage forming section. Furthermore, in the above-described embodiment, the undercover 4 of the vehicle 1 includes the first to third covers 4a to 4c, and the first and second fixing brackets 30, 32 are covered with the third cover 4c. However, the undercover 4 may not be provided, and the undercover 4 may be constructed of any number of members. Moreover, in the above-described embodiment, the vehicle includes the engine as a prime mover. However, the present disclosure can also be applied to a vehicle that includes a rotary electric machine such as a motor or a motor/generator instead of the engine or in addition to the engine.

DESCRIPTION OF REFERENCE SIGNS AND NUMERALS

1: Vehicle
2: Floor panel
4: Undercover
4a: First cover
4b: Second cover
4c: Third cover
6a: Front wheel
6b: Rear wheel
8: Engine
10: Battery cooler
12: Battery case
12a: Harness
12b: Terminal
12c: Terminal cover
14: Exhaust pipe
16: Tunnel section
18a, 18b: Tunnel side frame
20a, 20b: Floor frame
22a, 22b: Side sill
24a: First tunnel cross member
24b: Second tunnel cross member
26: Recessed section
28a: First recessed section cross member (cross member)
28b: Second recessed section cross member
30: First fixing bracket (fixing bracket)
30a: Ventilation passage forming section
30b: Fixed section
30c: Arm section
30d: Front end
32: Second fixing bracket (fixing bracket)
32a: Ventilation passage forming section
32b: Fixed section
32c: Arm section
32d: Bottom side section
34: First seal member
36: Second seal member
38: Battery recessed section
39: Protector
40: Ventilation passage
42: Ventilation passage
44: Additional ventilation passage
46: Dent section
46a: Opening

The invention claimed is:

1. A passive battery cooler for a battery mounted on a vehicle, the passive battery cooler comprising:
a battery case that accommodates the battery and attaches to a lower side of a floor panel of the vehicle; and
a fixing bracket that fixes the battery case to the floor panel of the vehicle,
wherein the fixing bracket and a bottom surface of the battery case constitute a ventilation passage that extends in a longitudinal direction of the vehicle, and
wherein the fixing bracket provides a flow passage cross-sectional area at a front end of the ventilation passage that is larger than a flow passage cross-sectional area behind the front end of the ventilation passage.

2. The passive battery cooler according to claim 1,
wherein the fixing bracket is configured so that a closed cross section thereof is formed by the fixing bracket and the bottom surface of the battery case, and
the ventilation passage is opened in the longitudinal direction of the vehicle.

3. The passive battery cooler according to claim 1,
wherein a recessed section is formed on the bottom surface of the battery case, and
the ventilation passage is formed between a surface of the recessed section and the fixing bracket.

4. The passive battery cooler according to claim 1, wherein the fixing bracket comprises:
a fixed section that abuts the bottom surface of the battery case; and
a ventilation passage forming section that is located farther away from the bottom surface of the battery case than the fixed section.

5. The passive battery cooler according to claim 1, further comprising:
a first seal that is attached to the battery case,
wherein the first seal is attached to a front side of the front end of the ventilation passage, a prime mover is disposed on a front side of the first seal, and high-temperature air that is heated by the prime mover is suppressed by the first seal from flowing into the ventilation passage.

6. A passive battery cooler for a battery mounted on a vehicle, the passive battery cooler comprising:
a battery case that accommodates the battery and attaches to a lower side of a floor panel of the vehicle;
a cross member that crosses the battery case in a vehicle width direction of the vehicle and is attached to the floor panel; and
a fixing bracket that fixes the battery case to the floor panel of the vehicle,
wherein the fixing bracket further comprises:
a first fixing bracket that is attached on a front side of the cross member, and
a second fixing bracket that is attached on a rear side of the cross member,
wherein the fixing bracket and a bottom surface of the battery case constitute a ventilation passage that extends in a longitudinal direction of the vehicle.

7. The passive battery cooler according to claim 6, further comprising:
a second seal attached to the bottom surface of the battery case such that an additional ventilation passage is formed between the cross member and the bottom surface of the batter case.

8. The passive battery cooler according to claim 6 further comprising:
a protector attached to the battery case so as to protect the battery case, the protector being attached between the first fixing bracket and the second fixing bracket in the longitudinal direction of the vehicle.

9. The passive battery cooler according to claim 1, further comprising:
an undercover that is attached to a bottom surface of the vehicle, and covers the battery case, the fixing bracket having an opening from which travel wind is introduced into a front-end opening of the ventilation passage.

10. A vehicle comprising:
a body having a floor panel;
a prime mover disposed on a front side of the floor panel; and
a passive battery cooler for a battery mounted on the vehicle, the passive battery cooler comprising:
a battery case that accommodates the battery and attaches to a lower side of the floor panel of the vehicle,
a fixing bracket that fixes the battery case to the floor panel of the vehicle, wherein the fixing bracket and a bottom surface of the battery case constitute a ventilation passage that extends in a longitudinal direction of the vehicle; and
a first seal that is attached to the battery case, wherein the first seal is disposed on a front side of a front end of the ventilation passage and a rear side of the prime mover, the first seal forms a seal between the bottom surface of the battery case and a top surface of an undercover, and the first seal suppresses a flow of high-temperature air heated by the prime mover into the ventilation passage,
wherein the undercover is attached to a bottom surface of the vehicle and covers the battery case and the fixing bracket, the undercover having an opening from which travel wind is introduced into a front-end opening of the ventilation passage, and
wherein the opening is disposed between the first seal and the front end of the ventilation passage.

11. The vehicle according to claim 10,
wherein the fixing bracket is configured so that a closed cross section thereof is formed by the fixing bracket and the bottom surface of the battery case, and
the ventilation passage is opened in the longitudinal direction of the vehicle.

12. The vehicle according to claim 10,
wherein the fixing bracket provides a flow passage cross-sectional area at a front end of the ventilation passage that is larger than a flow passage cross-sectional area behind the front end of the ventilation passage.

13. The vehicle according to claim 10,
wherein a recessed section is formed on the bottom surface of the battery case, and
the ventilation passage is formed between a surface of the recessed section and the fixing bracket.

14. The vehicle according to claim 10,
wherein the fixing bracket comprises:
a fixed section that abuts the bottom surface of the battery case; and
a ventilation passage forming section that is located farther away from the bottom surface of the battery case than the fixed section.

15. The vehicle according to claim 10, further comprising:
a cross member that crosses the battery case in a vehicle width direction of the vehicle is attached to the floor panel, and
the fixing bracket further comprises:
a first fixing bracket that is attached on a front side of the cross member, and
a second fixing bracket that is attached on a rear side of the cross member.

16. The vehicle according to claim 15, further comprising:
a second seal attached to the bottom surface of the battery case such that an additional ventilation passage is formed between the cross member and the bottom surface of the battery case.

17. The vehicle according to claim 15 further comprising:
a protector attached to the battery case so as to protect the battery case, the protector being attached between the first fixing bracket and the second fixing bracket in the longitudinal direction of the vehicle.

* * * * *